United States Patent
Kang et al.

(10) Patent No.: US 10,861,048 B2
(45) Date of Patent: Dec. 8, 2020

(54) CONTENT SCHEDULING METHOD AND APPARATUS

(71) Applicant: SAMSUNG SDS CO., LTD., Seoul (KR)

(72) Inventors: Ji Hoon Kang, Seoul (KR); Young Hyun Choi, Seoul (KR); A Hyang Han, Seoul (KR); Min Sik Chu, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 390 days.

(21) Appl. No.: 15/785,591

(22) Filed: Oct. 17, 2017

(65) Prior Publication Data
US 2018/0108041 A1    Apr. 19, 2018

(30) Foreign Application Priority Data
Oct. 17, 2016    (KR) .......................... 10-2016-0134105

(51) Int. Cl.
*G06Q 30/00* (2012.01)
*G06Q 30/02* (2012.01)
*H04N 21/414* (2011.01)

(52) U.S. Cl.
CPC ..... *G06Q 30/0264* (2013.01); *G06Q 30/0244* (2013.01); *G06Q 30/0246* (2013.01); *H04N 21/41415* (2013.01)

(58) Field of Classification Search
CPC ........................ G06Q 30/0244; G06Q 30/0246
See application file for complete search history.

(56) References Cited

U.S. PATENT DOCUMENTS

| | | | |
|---|---|---|---|
| 9,747,497 B1 * | 8/2017 | Sharma | G06Q 30/0201 |
| 9,947,018 B2 | 4/2018 | Brooks et al. | |
| 10,026,003 B2 * | 7/2018 | Houri | G06K 9/00771 |
| 2008/0134236 A1 | 6/2008 | Iijima et al. | |

(Continued)

FOREIGN PATENT DOCUMENTS

| | | |
|---|---|---|
| JP | 2012-27808 A | 2/2012 |
| KR | 10-2015-0121437 A | 5/2001 |

(Continued)

OTHER PUBLICATIONS

Vijayakumar et al., A Study on Video Data Monitoring, Aug. 25, 2012, International Journal of Multimedia Information Retrieval, vol. 1, pp. 153-172 (Year: 2012).*

(Continued)

*Primary Examiner* — Michael W Schmucker
(74) *Attorney, Agent, or Firm* — Sughrue Mion, PLLC

(57) ABSTRACT

A content scheduling method is provided. The content scheduling method, which is performed by a content scheduling apparatus, comprises acquiring a total play count of target content, determining a plurality of weight values of the target content with respect to a plurality of time slots, each weight value of the plurality of weight values indicating a first preference for the target content with respect to each time slot of the plurality of time slots, generating a linear programming model using the acquired total play count and the plurality of weight values and determining, via a processor, a play count of the target content in the each time slot of the plurality of time slots based on the linear programming model.

14 Claims, 16 Drawing Sheets

(56) References Cited

U.S. PATENT DOCUMENTS

| | | | |
|---|---|---|---|
| 2009/0012848 A1 | 1/2009 | Brooks et al. | |
| 2013/0024286 A1* | 1/2013 | Envarli | G06Q 30/02 |
| | | | 705/14.61 |
| 2015/0134460 A1* | 5/2015 | Tian | G06Q 30/0251 |
| | | | 705/14.66 |
| 2017/0091822 A1 | 3/2017 | Tian et al. | |
| 2017/0289596 A1* | 10/2017 | Krasadakis | H04W 4/029 |
| 2018/0018508 A1* | 1/2018 | Tusch | G06K 9/00771 |
| 2018/0108033 A1 | 4/2018 | Choi et al. | |

FOREIGN PATENT DOCUMENTS

| | | |
|---|---|---|
| KR | 10-2002-0091101 A | 12/2002 |
| KR | 10-0734580 B1 | 7/2007 |
| KR | 10-2010-0033525 A | 3/2010 |
| KR | 10-2011-0028067 A | 3/2011 |
| KR | 10-2013-0046867 A | 5/2013 |
| KR | 10-2013-0052883 A | 5/2013 |
| KR | 10-2014-0016133 A | 2/2014 |
| KR | 10-1474865 B1 | 12/2014 |
| KR | 10-2016-0002564 A | 1/2016 |
| KR | 10-2016-0019997 A | 2/2016 |
| KR | 10-2018-0041857 A | 4/2018 |

OTHER PUBLICATIONS

Ajay Srinivasan Aravamudhan., "Optimal Advertisement Scheduling in Breaks of Random Lengths", Singapore Management University, Institutional Knowledge at Singapore Management University, Dissertations and Theses Collection (Open Access), (2011), (100 Pages Total) URL: http://lnk.library.smu.edu.sg/etd_coll/80.

Communication dated Nov. 23, 2018, issued by the Korean Intellectual Property Office in counterpart Korean Application No. 10-2016-0134105.

Communication dated Apr. 8, 2019, issued by the Korean Intellectual Property Office in counterpart Korean Patent Application No. 10-2016-0134105.

* cited by examiner

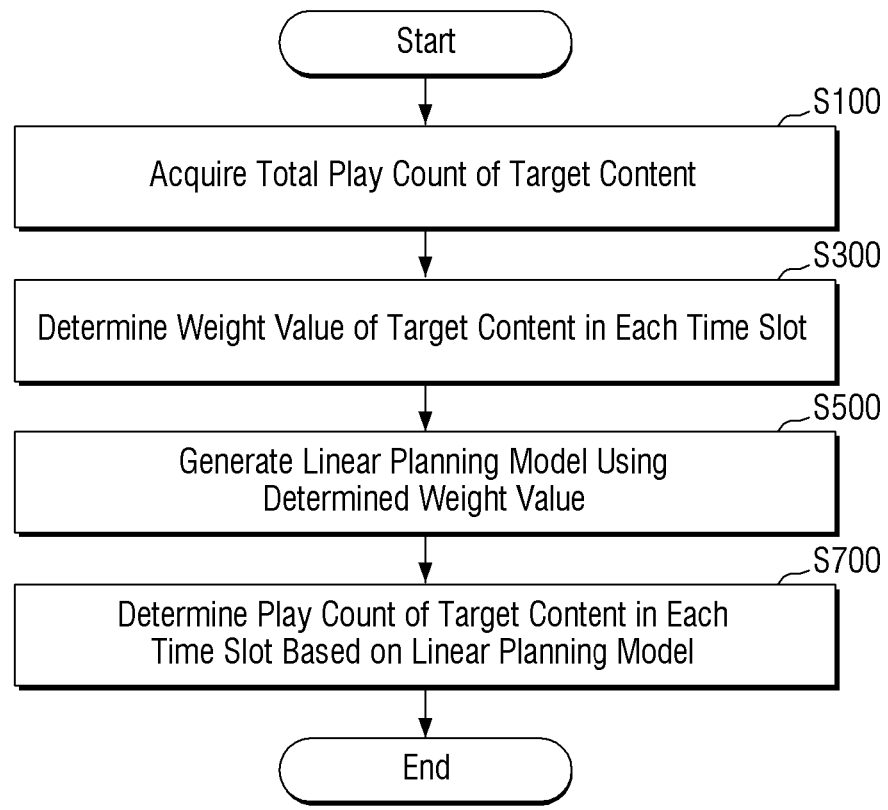

FIG. 8A

| Target Customer Base | 10s Age Group | 20s Age Group | 30s Age Group |
|---|---|---|---|
| Weight Value | 10 | 50 | 40 |

FIG. 8B

| Customer Base \ Time Slot | 9:00 a.m. | 3:00 p.m. | 9:00 p.m. |
|---|---|---|---|
| 10s Age Group | 20 | 60 | 20 |
| 20s Age Group | 20 | 20 | 60 |
| 30s Age Group | 60 | 20 | 20 |

FIG. 8C

| Time Slot | 9:00 a.m. | 3:00 p.m. | 9:00 a.m. |
|---|---|---|---|
| Weight Value | 36 | 24 | 40 |

FIG. 9A

| | Linear Planning Model |
|---|---|
| Decision Variable | $X_{ij}$, for $i = 1, 2, \cdots, 24$ <br> $j = 1, 2, \cdots, n$ |
| Objective Function | $\max\left(\sum_{j=1}^{n}\sum_{i=1}^{24} W_{ij} * X_{ij}\right)$ |
| Constraints | $\sum_{i=1}^{24} X_{ij} \geq N_j$, for $j = 1, 2, \cdots, n$ |
| | $\sum_{j=1}^{n} X_{ij} * H_j \leq 3600$, for $i = 1, 2, \cdots, 24$ |
| | $X_{ij} \geq 0$, for $i = 1, 2, \cdots, 24$ <br> $j = 1, 2, \cdots, n$ |

FIG. 9B

| | Linear Planning Model |
|---|---|
| Decision Variable | $X_{ij}$, for $i = 1, 2, \cdots, 24$ <br> $j = 1, 2, \cdots, n$ |
| Objective Function | $\max\left(\sum_{j=1}^{n}\sum_{i=1}^{24} W_{ij} * X_{ij}\right)$ |
| Constraints | $\sum_{i=1}^{24}(X_{ij} + S_{ij}) = N_j$, for $j=1, 2, \cdots, n$ |
| | $\sum_{j=1}^{n}(X_{ij} + S_{ij}) * H_j = 3600$, for $i=1, 2, \cdots, 24$ |
| | $X_{ij} \geq 0$, for $i = 1, 2, \cdots, 24$ <br> $j = 1, 2, \cdots, n$ |

FIG. 10

| Linear Planning Model | |
|---|---|
| Decision Variable | $X_{ij}, \text{ for } i = 6, 7, \cdots, 23$ <br> $j = 1, 2, \cdots, n$ |
| Objective Function | $\max\left( \sum_{j=1}^{n} \sum_{i=6}^{23} W_{ij} * X_{ij} \right)$ |
| Constraints | $\sum_{i=6}^{23} X_{ij} \geq N_j, \text{ for } j = 1, 2, \cdots, n$ |
| | $\sum_{j=1}^{n} X_{ij} * H_j \leq 3600, \text{ for } i = 6, 7, \cdots, 23$ |
| | $X_{ij} \geq 0, \text{ for } i = 6, 7, \cdots, 23$ <br> $j = 1, 2, \cdots, n$ |

FIG. 11

| | Linear Planning Model |
|---|---|
| Decision Variable | $X_{ij}$, for $i = 6, 7, \cdots, 23$ <br> $j = 1, 2, \cdots, n$ |
| Objective Function | $\max\left( \sum_{j=1}^{n} \sum_{i=6}^{23} (W_{ij} \otimes R_j) * X_{ij} \right)$ |
| Constraints | $\sum_{i=6}^{23} X_{ij} \geq N_j$, for $j = 1, 2, \cdots, n$ |
| | $\sum_{j=1}^{n} X_{ij} * H_j \leq 3600$, for $i = 6, 7, \cdots, 23$ |
| | $X_{ij} \geq 0$, for $i = 6, 7, \cdots, 23$ <br> $j = 1, 2, \cdots, n$ |

FIG. 12

| | Linear Planning Model |
|---|---|
| Decision Variable | $X_{ij}$, for $i = 6, 7, \cdots, 23$ <br> $j = 1, 2, \cdots, n$ |
| Objective Function | $\max\left(\sum_{j=1}^{n} \sum_{i=6}^{23} (W_{ij} \otimes R_j) * X_{ij}\right)$ |
| Constraints | $\sum_{i=6}^{23} X_{ij} \geq N_j$, for $j = 1, 2, \cdots, n$ |
| | $\sum_{j=1}^{n} X_{ij} * H_j \leq 3600$, for $i = 6, 7, \cdots, 23$ |
| | $8 \leq X_{ij} \leq 32$, for $i = 6, 7, \cdots, 23$ <br> $j = 1, 2, \cdots, n$ |
| | $X_{ij} \geq 0$, for $i = 6, 7, \cdots, 23$ <br> $j = 1, 2, \cdots, n$ |

FIG. 13

| | Linear Planning Model |
|---|---|
| Decision Variable | $X_{ij}$, for $i = 6, 7, \cdots, 23$ <br> $j = 1, 2, \cdots, n$ |
| Objective Function | $\max\left( \sum_{j=1}^{n} \sum_{i=6}^{23} (W_{ij} \otimes R_j) * X_{ij} \right)$ |
| Constraints | $\sum_{i=6}^{23} X_{ij} \geq N_j$, for $j = 1, 2, \cdots, n$ <br><br> $\sum_{j=1}^{n} X_{ij} * H_j \leq 3600$, for $i = 6, 7, \cdots, 23$ <br><br> $\sum_{j=1}^{n} \sum_{i=6}^{23} X_{ij}^{t} * H_j \leq 3600 * 18 * R^t$, for $t = 1, 2, 3$ <br> $\left( R^1 = 0.2, R^2 = 0.4, R^3 = 0.4 \right)$ <br><br> $X_{ij} \geq 0$, for $i = 6, 7, \cdots, 23$ <br> $j = 1, 2, \cdots, n$ |

CONTENT SCHEDULING METHOD AND APPARATUS

This application claims priority to Korean Patent Application No. 10-2016-0134105, filed on Oct. 17, 2016, and all the benefits accruing therefrom under 35 U.S.C. § 119, the disclosure of which is incorporated herein by reference in its entirety.

BACKGROUND

1. Field

The present disclosure relates to a content scheduling method and apparatus, and more particularly, to a method and apparatus for scheduling content in units of time zones so as to improve the exposure effect of the content.

2. Description of the Related Art

With the development of display device and network technologies, outdoor advertising utilizing various forms of digital signages such as video walls and kiosks is becoming a new trend in the advertisement industry.

In outdoor advertising using a digital signage, content scheduling is indispensable to improve the exposure of advertising to target customers. This is because, in order to improve the exposure effect of advertisement content to its target customer base that varies from hour to hour, the advertisement content needs to be appropriately assigned between time zones.

FIGS. 1A and 1B are graphs showing an improvement in the effect of exposure of advertising to a target customer base that can be achieved by content scheduling. Referring to FIGS. 1A and 1B, even if the total play count of advertisement content is uniform, the effect of exposure of the advertisement content can be considerably improved if the advertisement content is scheduled in consideration of a total floating population in each time zone.

However, due to lack of a scheduling algorithm, an existing outdoor advertising system using a digital signage has not yet been able to perform content scheduling in consideration of the number of target customers. In addition, in the case of outdoor advertising using a digital signage, various constraints such as different play rates for different types of advertisement content are imposed, thereby making content scheduling highly difficult and complicated.

Accordingly, a content scheduling method is needed which is capable of satisfying various constraints that can be imposed in an outdoor advertisement system and maximizing the effect of exposure of advertisement content to its target customer base.

SUMMARY

Exemplary embodiments of the present disclosure provide a content scheduling method and apparatus capable of improving the effect of exposure of content to a target customer base.

Exemplary embodiments of the present disclosure also provide a linear programming model capable of maximizing the effect of exposure of content to a target customer base while satisfying various constraints imposed.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a content scheduling method, which is performed by a content scheduling apparatus, comprising acquiring a total play count of target content, determining a plurality of weight values of the target content with respect to a plurality of time slots, each weight value of the plurality of weight values indicating a first preference for the target content with respect to each time slot of the plurality of time slots, generating a linear programming model using the acquired total play count and the plurality of weight values and determining, via a processor, a play count of the target content in the each time slot of the plurality of time slots based on the linear programming model.

According to another exemplary embodiment of the present disclosure, there is provided a content scheduling apparatus comprising at least one processor, a network interface configured to communicate with a content playing apparatus, a memory configured to load a computer program executed by the at least one processor and a storage configured to store the computer program which, when executed by the at least one processor, causes the at least one processor to perform operations comprising acquiring a total play count of target content, determining a plurality of weight values of the target content with respect to a plurality of time slots, each weight value of the plurality of weight values indicating a preference for the target content with respect to each time slot of the plurality of time slots, generating a linear programming model using the acquired total play count and the plurality of weight values and determining a play count of the target content in the each time slot of the plurality of time slots based on the linear programming model.

According to another exemplary embodiment of the present disclosure, there is provided a computer-readable storage medium storing instructions which, when executed by a processor, cause the processor to perform operations comprising acquiring a total play count of target content, determining a plurality of weight values of the target content in with respect to a plurality of time slots, each weight value of the plurality of weight values indicating a preference for the target content with respect to each time slot of the plurality of time slots, generating a linear programming model using the acquired total play count and the plurality of weight values and determining a play count of the target content in the each time slot of the plurality of time slots based on the linear programming model.

According to the aforementioned and other exemplary embodiments of the present disclosure, the effect of exposure of target content to a target customer base can be improved by scheduling the target content in consideration of the target content's preference for each time zone. For example, if the target content is advertisement content, the effect of exposure of the advertisement content to its target customer base can be improved by scheduling the target content in a preferred time zone with a large floating population of target customers.

In addition, a content providing entity's profit can be increased by improving the effect of exposure of target content to a target customer base through scheduling. For example, if the target content is advertisement content, the advertising entity's profit can be increased by improving the effect of exposure of the target content to its target customer base. Since the effect of exposure of the target content to its target customer base can be improved, the profit of advertising company can be increased, and as a result, the profit of the operator of a content playing apparatus (or a content playing entity) can also be increased.

Moreover, since scheduling is performed in consideration of not only target content's preference for each time zone, but also the target content's priority value determined by the contract cost of the target content, the profit of the content playing entity can be further increased. For example, if there exists multiple target content items and the multiple target content items have the same or similar preferred time zones, target content items having a high contract cost are may be prioritized over other target content items, and thus, the contract cost for securing preferred time zones for content may be raised. Therefore, the profit of the content playing entity can be further increased.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which:

FIG. 6 is a flowchart illustrating a content scheduling method according to an exemplary embodiment of the present disclosure;

FIGS. 7A through 7C are views for explaining the relationship between the length of each time slot and the play time of target content;

FIGS. 8A through 8C are views for explaining how to determine the weight value of target content in each time slot based on the target content's preference for each target customer base and the floating population of each target customer base; and FIGS. 9A through 13 are views for explaining linear programming models according to some exemplary embodiments of the present disclosure.

DETAILED DESCRIPTION

Figure 1A:
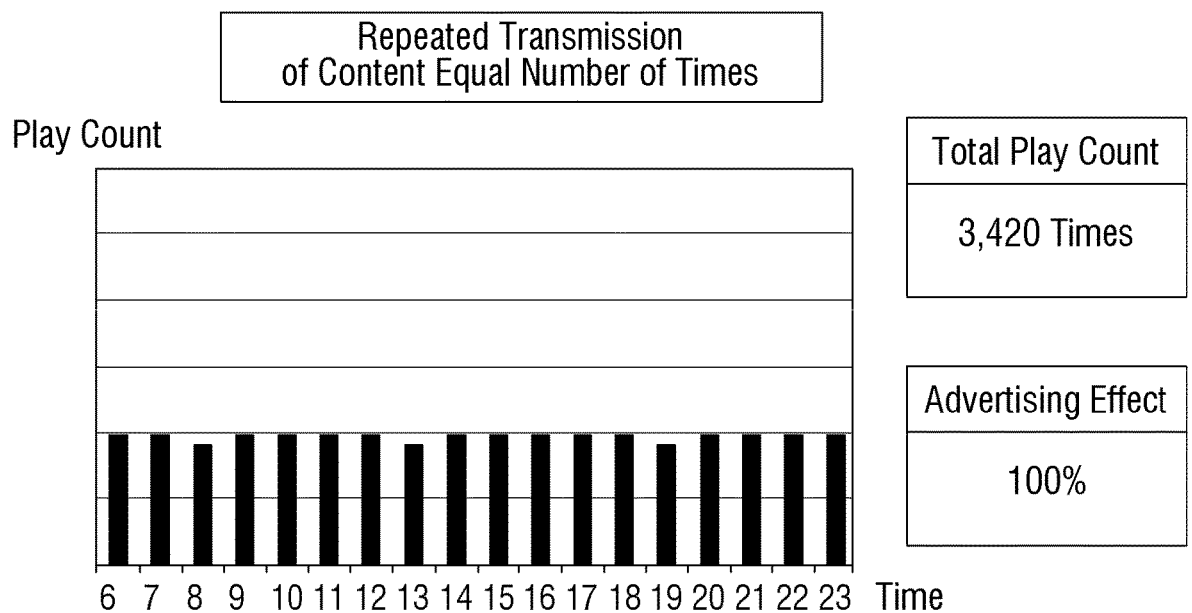
FIGS. 1A and 1B are graphs showing differences in the effect of exposure of advertising that can be achieved by content scheduling.
Figure 1B:
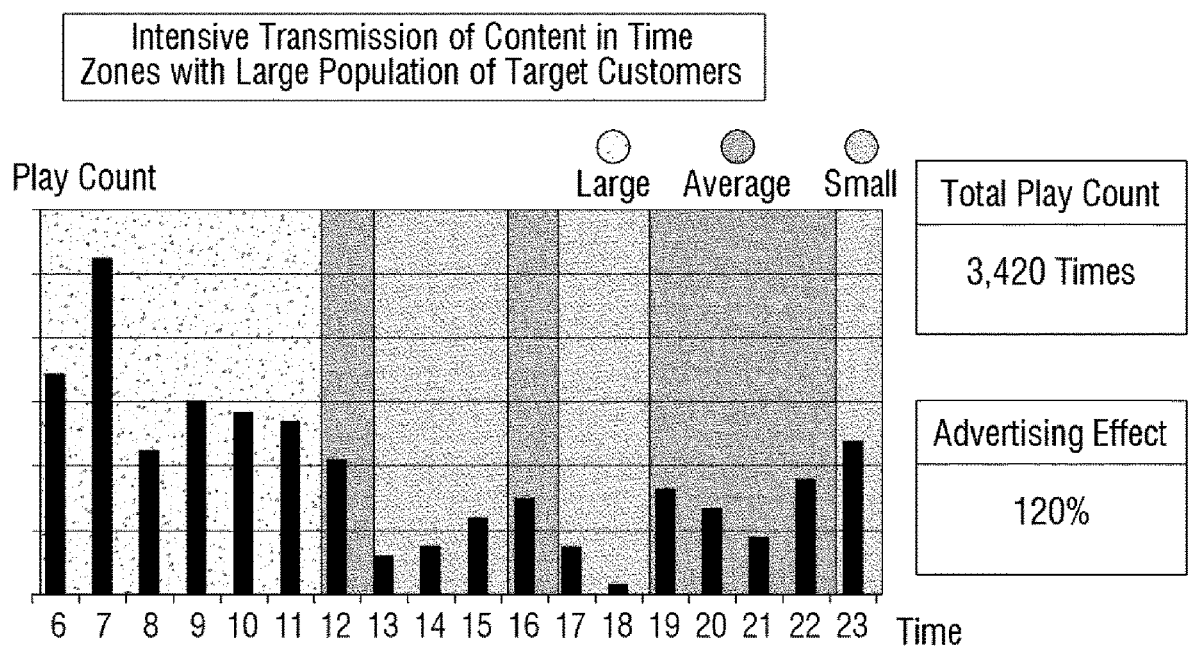

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. The definitions of terms used in this specification are as follows.

As used herein, the term "scheduling" refers to a task of determining the play count or the play order of target content in each time slot during a scheduling target period.

As used herein, the term "content" refers to digital information that can be played by a device having a display function, such as, for example, advertisement content, movie content, music content, or the like.

As used herein, the term "scheduling target period" refers to an entire period during which content scheduling is performed.

As used herein, the term "time slot" refers to a segment obtained by dividing a scheduling target period and also means the unit of time for determining the play count of target content. For example, when the scheduling target period is one day and the play count of the target content is determined every one hour, a total of 24 time slots (=24 hr/1 hr) are generated, and the play count of the target content in each time slot is calculated and provided as a scheduling result. In this example, the length of each time slot may be one hour.

As used herein, the term "play time of content" refers to the running time or the length of content.

As used herein, the term "total play count" refers to a minimum play count, which is a minimum number of times each content should be played by a content playing apparatus 300, or a maximum play count, which is a maximum number of times each content can be played by the content playing apparatus 300. For example, the total play count of advertisement content may be a minimum number of plays of the advertisement content designated by an advertising contract.

As used herein, the term "total floating population" (or the number of the floating population) refers to a number of people who visited or pass by a designated geographical area (e.g. near the area where a content playing apparatus is installed).

Exemplary embodiments of the present disclosure will hereinafter be described with reference to the accompanying drawings.

First, for a better understanding of the inventive concept of the present disclosure, the concept of content scheduling according to an exemplary embodiment of the present disclosure will hereinafter be described with reference to FIG. 2. In the description that follows, it is assumed that the term "content" as in "content scheduling" denotes advertisement content, unless specified otherwise. However, it is obvious that content scheduling is also applicable to various types of content, other than advertisement content. In other words, the inventive concept of the present disclosure is also applicable to, for example, music content, video content, and the like.

Figure 2:
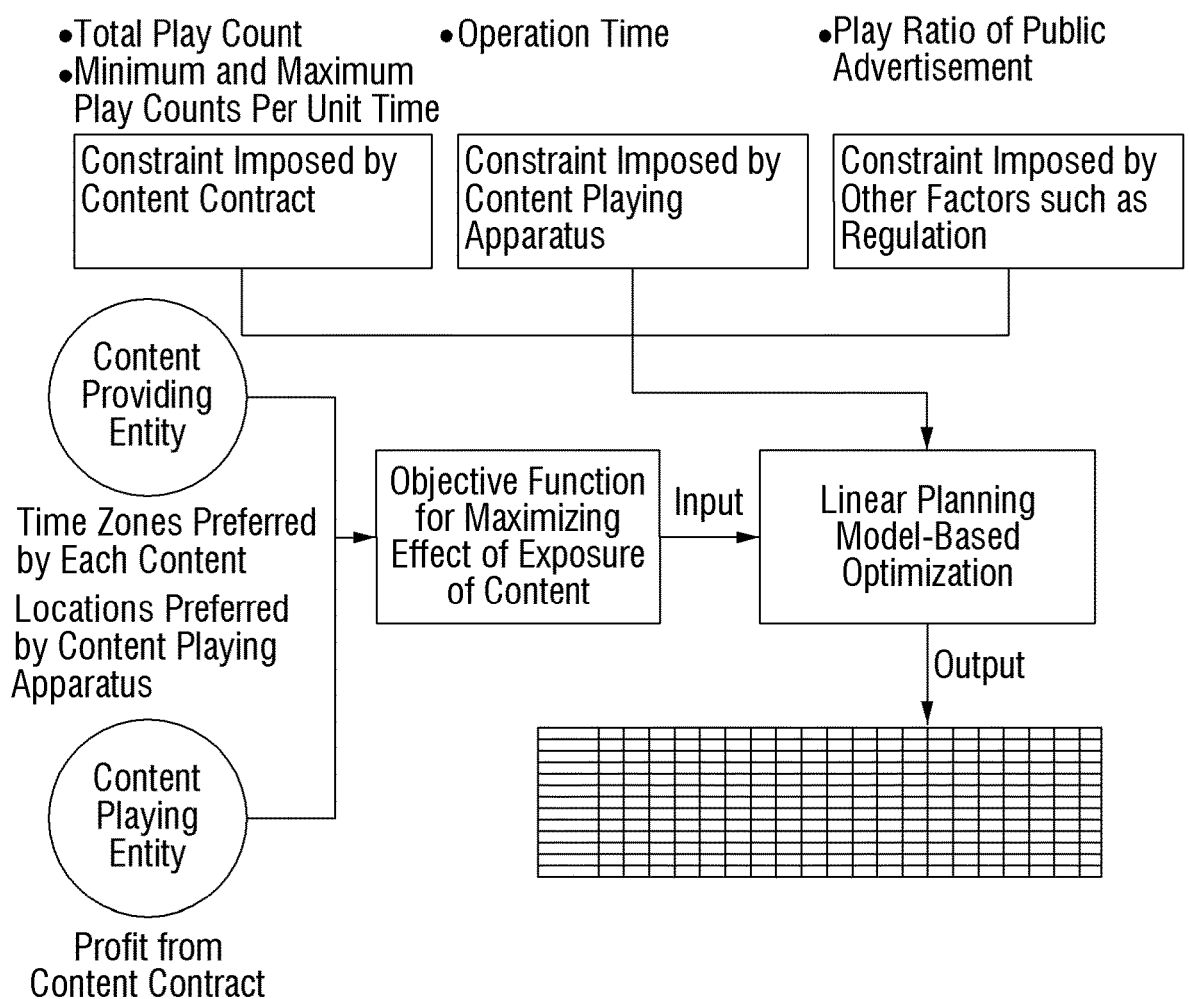
FIG. 2 is a schematic view for explaining the content of content scheduling according to an exemplary embodiment of the present disclosure.

Referring to FIG. 2, content scheduling may be understood as being an operation of determining an optimal placement of target content in each time zone in order to achieve a particular objective, for example, maximize the effect of exposure of the target content to its target customer base. If various constraints are added, as shown in FIG. 2, content scheduling determines an optimal placement of the target content that can satisfy the added constraints. The added constraints may include the total play count of the target content that can be determined by a contact between a content providing entity and a content playing entity, the operation time of a content playing apparatus, and the play ratio of public advertisement content mandated by a regulation.

In short, content scheduling is an operation of determining the optimal placement of the target content in each time zone in order to achieve a particular objective while satisfying the given constraints. If the particular objective is represented as an objective function, content scheduling may be understood as being an operation of determining a placement of the target content in each time zone that can optimize (i.e., maximize or minimize) the value of the objective function.

The placement of the target content in each time zone is an operation of finding an optimal combination of the target content among a plurality of combinations of the target content, and may thus be considered a type of combination optimization problem. Thus, when the relationship between an objective function and a constraint are modeled as a linear relationship, the placement of the target content in each time zone may be determined using a linear programming model. That is, content scheduling may be performed by finding the optimal solution or approximate optimal solution of a linear programming model having the objective function and the constraint.

A linear programming model is a model capable of finding an optimal solution or an approximate optimal solution through linear programming and includes a decision variable, an objective function, and a constraint. The linear programming model is already well known in the art to which the present disclosure pertains, and thus, a further description thereof will be omitted.

Exemplary embodiments of the present disclosure, which embody the above-described concept of content scheduling, will hereinafter be described with reference to the accompanying drawings.

Figure 3:
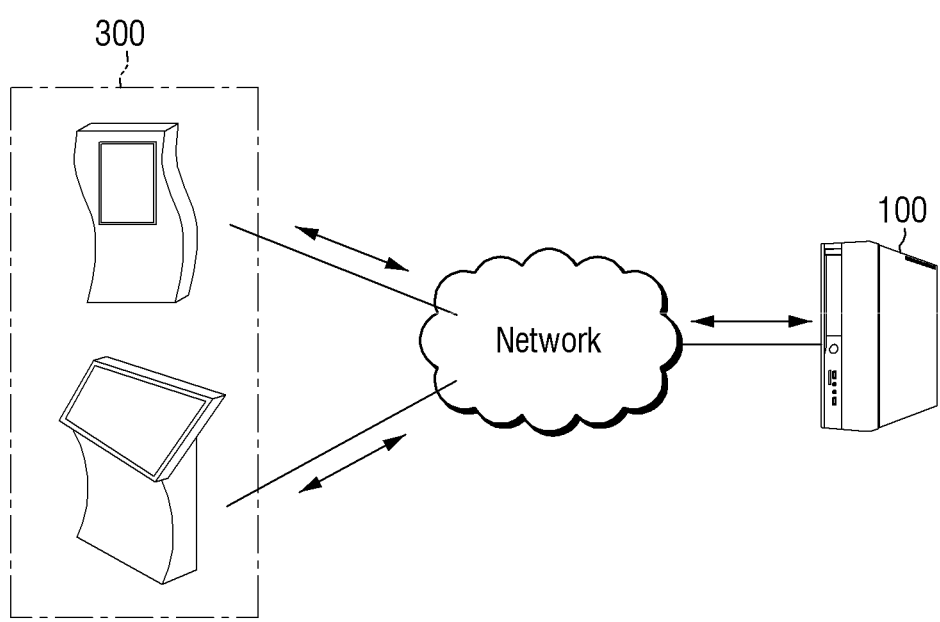
FIG. 3 is a configuration diagram of a content providing system according to an exemplary embodiment of the present disclosure.

FIG. 3 is a configuration diagram of a content providing system according to an exemplary embodiment of the present disclosure.

Referring to FIG. 3, the content providing system is a system that produces a scheduling result by calculating the play count of target content in each time slot, and allocates the target content between time slots and plays the target content according to the scheduling result. For example, the content providing system may be an outdoor advertising system playing advertisement content scheduled via a digital signage.

The content providing system may include a content scheduling apparatus 100 and at least one content playing apparatus 300. The content scheduling apparatus 100 and the content playing apparatus 300 may be connected via a network. Although not specifically illustrated in FIG. 3, the content providing system may further include a content controlling apparatus controlling the content playing apparatus 300 according to the scheduling result provided by the content scheduling apparatus 100. Alternatively, the content scheduling apparatus 100 may be configured to perform not only the functions of a content managing apparatus, but also the functions of a content controlling apparatus.

The content scheduling apparatus 100 may be a computing device capable of producing a scheduling result for the target content. If the content scheduling apparatus 100 serves not only as a content managing apparatus, but also as a content controlling apparatus, the content scheduling apparatus 100 may control the content playing apparatus 300 via a network based on the scheduling result to control the play count and the play order of the target content. A method in which the content scheduling apparatus 100 schedules the target content will be described later with reference to FIG. 6.

The computing device may be, for example, a notebook computer, a desktop computer, a laptop computer, or the like, but the present disclosure is not limited thereto. That is, examples of the computing device include nearly all types of devices having a computing function and a communication function.

The content playing apparatus 300 is a device for playing content according to the scheduling result provided by the content scheduling apparatus 100. The content playing apparatus 300 may be implemented as various forms of digital signages such as, for example, a kiosk or a video wall installed in a public place (such as a bus terminal) or a commercial place (such as a shopping mall), but the present disclosure is not limited thereto. That is, the content playing apparatus 300 may be implemented as various types of devices having a content player function and a communication function. In a case where the content playing apparatus 300 is configured to play music content, the content playing apparatus 300 may not be provided with a display screen.

The network that connects the content scheduling apparatus 100 and the content playing apparatus 300 may be implemented as any type of wired/wireless network such as, for example, a local area network (LAN), a wide area network (WAN), or a mobile radio communication network.

FIG. 3 illustrates the content scheduling apparatus 100 and the content playing apparatus 300 as being separate physical devices, but the present disclosure is not limited thereto. That is alternatively, the content scheduling apparatus 100 and the content playing apparatus 300 may be implemented as different logics provided in the same physical device.

The content providing system according to an exemplary embodiment of the present disclosure has been described above with reference to FIG. 3. The detailed structure and the operation of the content scheduling apparatus 100 will hereinafter be described with reference to FIGS. 4 and 5.

Figure 4:
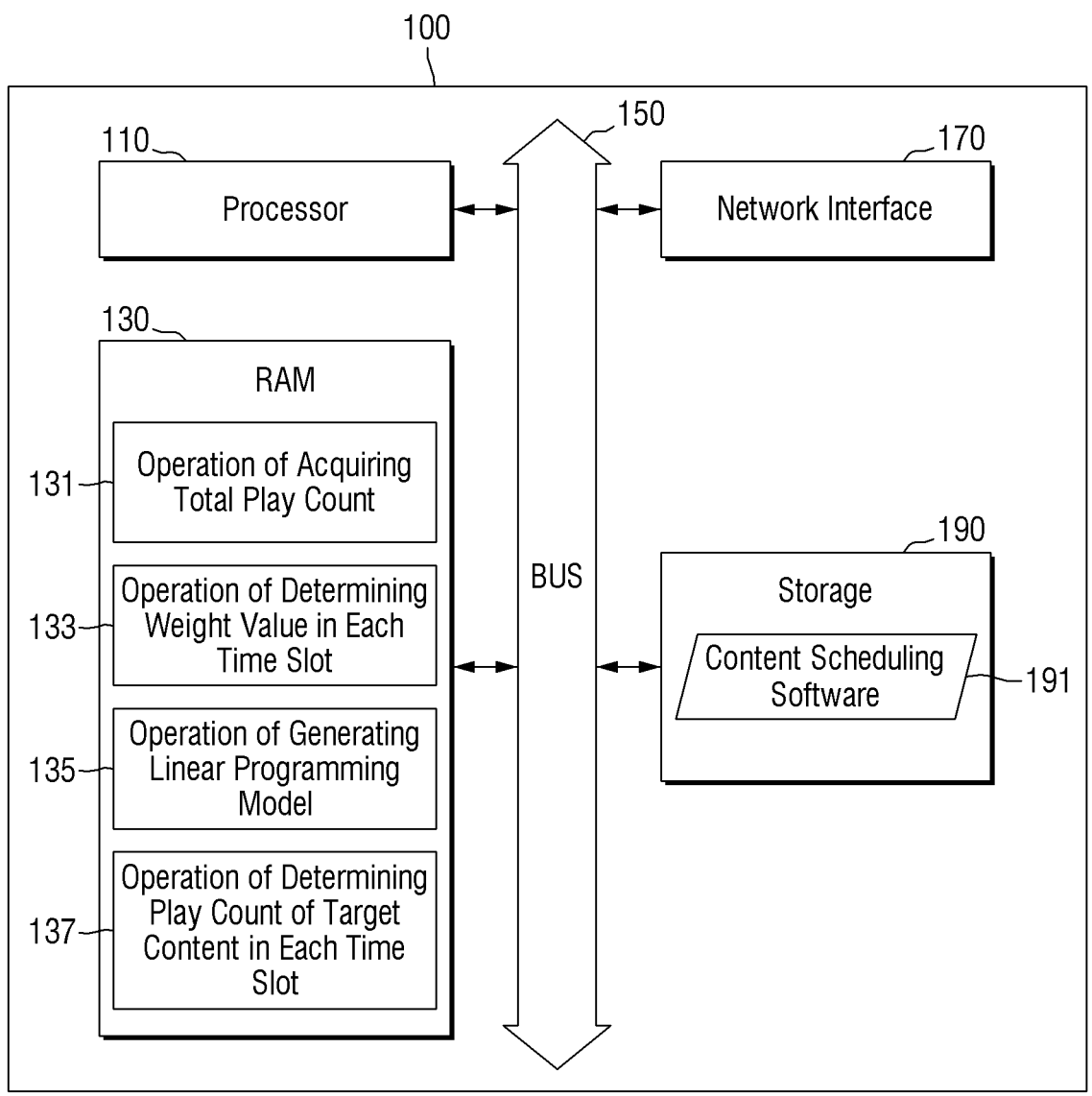
FIG. 4 is a hardware configuration diagram of a content scheduling apparatus according to an exemplary embodiment of the present disclosure.

Referring to FIG. 4, the content scheduling apparatus 100 may include at least one processor 110, a network interface 170, which performs communication with the content playing apparatus 300, a memory 130, which loads a computer program executed by the processor 110, and a storage 190, which stores content scheduling software 191. FIG. 4 illustrates only the elements that are closely relevant to exemplary embodiments of the present disclosure, but obviously, the content playing apparatus 300 may further include various general-purpose elements other than those set forth in FIG. 4.

The processor 110 controls the general operations of the elements of the content scheduling apparatus 100. The processor 110 may be configured to include a central processing unit (CPU), a micro-processor unit (MPU), a micro-controller unit (MCU), or an arbitrary processor that is already well known in the art to which the present disclosure pertains. The processor 110 may execute at least one application or program to perform a content scheduling method according to an exemplary embodiment of the present disclosure.

The memory 130 stores various data, instructions, and/or information. The memory 130 may load at least one program 191 from the storage 190 to perform the content scheduling method according to an exemplary embodiment of the present disclosure. FIG. 4 shows a random access memory (RAM) as an example of the memory 130.

The bus 150 provides an inter-component communication function for the content scheduling apparatus 100. The bus 150 may be implemented as various types of buses such as an address bus, a data bus, and a control bus.

The network interface 170 supports wired or wireless communication of the content scheduling apparatus 100. To this end, the network interface 170 may include a communication module that is already well known in the art to which the present disclosure pertains.

The network interface 170 may exchange data with the content playing apparatus 300 of FIG. 3 via a network. Also, the network interface 170 may transmit a control command to, or receive a control command from, the content playing apparatus 300 to perform content scheduling.

The storage 190 may non-temporarily store the program 191. FIG. 4 shows content scheduling software 191 as an example of the program 191.

The storage 190 may be a nonvolatile memory such as a read only memory (ROM), an erasable programmable ROM (EPROM), an electrically erasable programmable (EEPROM), or a flash memory, a hard disk, a removable disk, or any arbitrary form of computer-readable recording medium that is already well known in the art to which the present disclosure pertains.

The content scheduling software 191 is loaded in the memory 130 and is executed by the processor 110 to perform an operation 131 of acquiring the total play count of target content, an operation 133 of determining the weight value of the target content in each time slot, which indicates the target content's preference for each time slot, an operation 135 of generating a linear programming model using the total play count of the target content and the weight value of each time slot, and an operation 137 of determining the play count of the target content in each time slot using the linear programming model.

Figure 5:
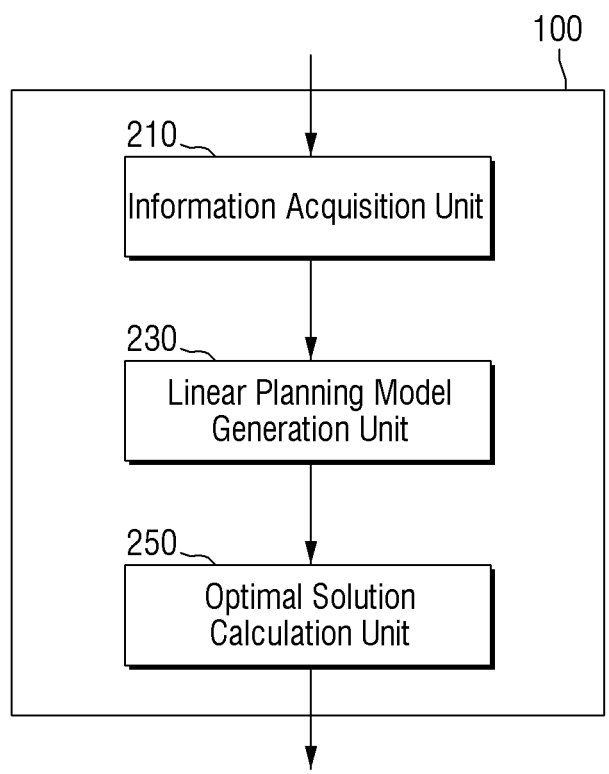
FIG. 5 is a functional block diagram of a content scheduling apparatus according to an exemplary embodiment of the present disclosure.

Referring to FIG. 5, the content scheduling apparatus 100 may include an information acquisition unit 210, a linear programming model generation unit 230, and an optimal solution calculation unit 250. FIG. 5 illustrates only the elements that are closely relevant to exemplary embodiments of the present disclosure, but obviously, the content scheduling apparatus 100 may further include various general-purpose elements other than those set forth in FIG. 5. The functions of the content scheduling apparatus 100 may be performed by the processor 110 of the content scheduling apparatus 100 of FIG. 4.

The information acquisition unit 210 may acquire various information for generating a linear programming model and may determine the weight value of each time slot and the priority value of target content based on the acquired information. The acquired information may include, for example, the play time of the target content, the total play count of the target content during a scheduling target period, a total floating population in each time zone, the target content's preference for each target customer base, and the floating population of each target customer base in each time zone.

The information acquisition unit 210 may determine the weight value of each time slot based on the target content's preference for each target customer base and the floating population of each target customer base in each time slot.

A method in which the information acquisition unit 210 acquires information may vary depending on how the content scheduling apparatus 100 is implemented. For example, the information acquisition unit 210 may receive information directly from a user via a graphical user interface (GUI) or may acquire information (such as the total play count of the target content) from a previously-stored configuration file. The information acquisition unit 210 may also acquire information from data received via a network. That is, the information acquisition unit 210 may acquire information in various manners, depending on how the content scheduling apparatus 100 is implemented.

The linear programming model generation unit 230 generates a linear programming model for performing scheduling based on the information acquired by the information acquisition unit 210. Specifically, the linear programming model generation unit 230 sets the play count of the target content in each time slot as a decision variable based on the acquired information, sets a function that maximizes the sum of the weight value of the target content in each time slot, multiplied by the decision variable for each time slot, as an objective function, and sets the total play count of the target content as a constraint. The decision variable, the objective function, and the constraint may vary depending on the acquired information.

For reference, when the play count of the target content in each time slot is set as the decision variable, the decision variable may be an integer of zero or greater. Thus, the optimal solution or approximate optimal solution of the linear programming model generated by the linear programming model generation unit 230 can be found according to an integer linear programming method.

The optimal solution calculation unit 250 provides a scheduling result by finding an optimal solution or an approximate optimal solution satisfying the linear programming model generated by the linear programming model generation unit 230. The optimal solution calculation unit 250 may use one or more algorithms that are already well known in the art to which the present disclosure pertains to find the optimal solution or approximate optimal solution of the generated linear programming model. For example, the optimal solution calculation unit 250 may use a branch and bound method to find the optimal solution of the generated linear programming model or may use a simplex method to convert the generated linear programming model into standard form to find the approximate optimal solution of the generated linear programming model. The approximate optimal solution found by the simplex method may be converted into an integer through rounding up or down, and the result of the conversion may be provided as the optimal solution of the generated linear programming model.

The optimal solution calculation unit 250 may include a software module that is already well known in the art to which the present disclosure pertains, such as Lindo or Lingo software, to perform the branch and bound method or the simplex method.

The elements of the content scheduling apparatus 100 of FIG. 5 may be either software elements or hardware elements such as field programmable gate arrays (FPGAs) or application-specific integrated circuits (ASICs), but the present disclosure is not limited thereto. The elements of the content scheduling apparatus 100 of FIG. 5 may be configured to reside in an addressable storage medium or to execute one or more processors. Each of the elements of the content scheduling apparatus 100 of FIG. 5 may be divided into one or more sub-elements such that the functions of the corresponding element can be distributed between the sub-elements, or the elements of the content scheduling apparatus 100 of FIG. 5 and the functions thereof may be incorporated into fewer elements.

The content scheduling apparatus 100 has been described above with reference to FIGS. 4 and 5. A content scheduling method according to an exemplary embodiment of the present disclosure will hereinafter be described with reference to FIG. 6.

FIG. 6 is a flowchart illustrating a content scheduling method according to an exemplary embodiment of the present disclosure. For ease of understanding, it is noted that an entity performing each step of the content scheduling method may be omitted in the description that follows.

Referring to FIG. 6, the content scheduling apparatus 100 acquires the total play count of target content (S100). As already mentioned above, the total play count of the target content refers to the minimum play count of the target content, which is a minimum number of times the target content should be played during a scheduling target period or the maximum number of the target content, which is a maximum number of times the target content can be played during the scheduling target period. The total play count of the target content may be determined by, for example, a contract between a content providing entity and a content playing entity.

Thereafter, the content scheduling apparatus 100 determines the weight value of the target content in each time slot, which indicates the target content's preference for each time slot (S300). For example, if the length of each time slot is "one hour", the content scheduling apparatus 100 may determine a predetermined weight value every one hour. The weight value of each time slot is set as a coefficient of an objective function of a linear programming model generated by the content scheduling apparatus 100, and may be determined based on various information according to the objective of scheduling.

For example, in order to allocate the target content to a time zone having a large floating population, regardless of each target customer base of the target content, the content scheduling apparatus 100 may determine the weight value of each time slot based on a total floating population in each time slot.

In another example, in a case where scheduling is performed to maximize the effect of exposure of the target content to its target customer base with any given contract cost, the content scheduling apparatus 100 may determine the weight value of each time slot based on a value obtained by dividing the floating population of each target customer base in each time slot by the contract cost of the target content.

In still another example, in a case where scheduling is performed in order to maximize the effect of exposure of the target content to its target customer base with any given contract cost, the content scheduling apparatus 100 may determine the weight value of each time slot based on the floating population of each target customer base in each time slot. For example, if the target customer base of the target content is males in their 20s, the content scheduling apparatus 100 may determine the weight value of each time slot based on the number of males in their 20s among the floating population in each time slot. That is, the content scheduling apparatus 100 may determine the weight value of each time slot by assigning a greater weight value to a time slot having a large floating population of target customers, i.e., a time slot having a large population of males in their 20s, than to other time slots.

Information such as the total floating population in each time slot and the floating population of each target customer base in each time slot may be acquired by video analytics. For example, in a case where the content playing apparatus 300 is a digital signage installed in a shopping mall, an image capturing apparatus installed near or embedded in the digital signage may capture or collect images of the surroundings of the digital signage, and an image analysis module may extract demographic data such as the total floating population in each time zone and the sexes and ages of members of the floating population in each time zone by applying a computer vision algorithm to the captured or collected images. Also, the image analysis module may determine the floating population of each target customer base in each time slot based on the total floating population in each time zone and the demographic data. Alternatively, the content scheduling apparatus 100 may acquire the total floating population in each time zone and the demographic data from the image analysis module and may determine the floating population of each target customer base in each time slot based on the total floating population in each time zone and the demographic data.

In order to precisely calculate the total floating population in each time slot, WiFi data collected via an access point (AP) may be additionally used. For example, in a case where a user passes by the content playing apparatus 300, communication for establishing a WiFi connection between the user's mobile terminal and the content playing apparatus 300 may be performed. Once a WiFi connection is established between the user's mobile terminal and the content playing apparatus 300, a WiFi probe signal may be collected via the AP, and the total floating population in each time zone may be measured using traffic data of the probe signal.

The content scheduling apparatus 100 may determine the weight value of the target content in each time slot based on the target content's preference for each target customer base and the floating population of each target customer base in each time slot, and this will be described later with reference to FIGS. 8A through 8C.

Thereafter, the content scheduling apparatus 100 generates a linear programming model using the total play count of the target content and the weight value of each time slot (S500). Specifically, the content scheduling apparatus 100 sets the play count of the target content in each time slot as a decision variable, sets an objective function using the weight value of each time slot and the decision variable, and sets a constraint using the total play count of the target content and the decision variable. The linear programming model may vary depending on the type of information acquired in S100 and will be described later with reference to FIGS. 9A through 13.

Thereafter, the content scheduling apparatus 100 determines the play count of the target content in each time slot using the linear programming model (S700). In other words, the content scheduling apparatus 100 may determine the play count of the target content in each time slot by calculating the value of the decision variable that corresponds to the optimal solution or the approximate optimal solution of the linear programming model. As described above, the optimal solution or the approximate optimal solution of the linear programming model may be calculated using the branch and bound method or the simplex method.

In the content scheduling method according to the exemplary embodiment of FIG. 6, the content scheduling apparatus 100 can perform scheduling in consideration of the weight value of the target content in each time slot, which indicates the target content's preference for each time slot. Also, even if the objective of scheduling is changed, a flexible scheduling can be performed simply by changing the weight value of each time slot. Also, the effect of exposure of the target content to its target customer base can be improved by determining the weight value of each time slot based on the total floating population in each time slot.

In the content scheduling method according to the exemplary embodiment of FIG. 6, a scheduling result is the play count of the target content in each time slot. If the play time of the target content and the length of each time slot are identical, the play count of the target content in each time slot may be zero or one. In this case, once the content scheduling apparatus 100 determines the play count of the target content in each time slot, the play order of the target content may be automatically determined. This will hereinafter be described in detail with reference to FIGS. 7A through 7C.

Figure 7B:
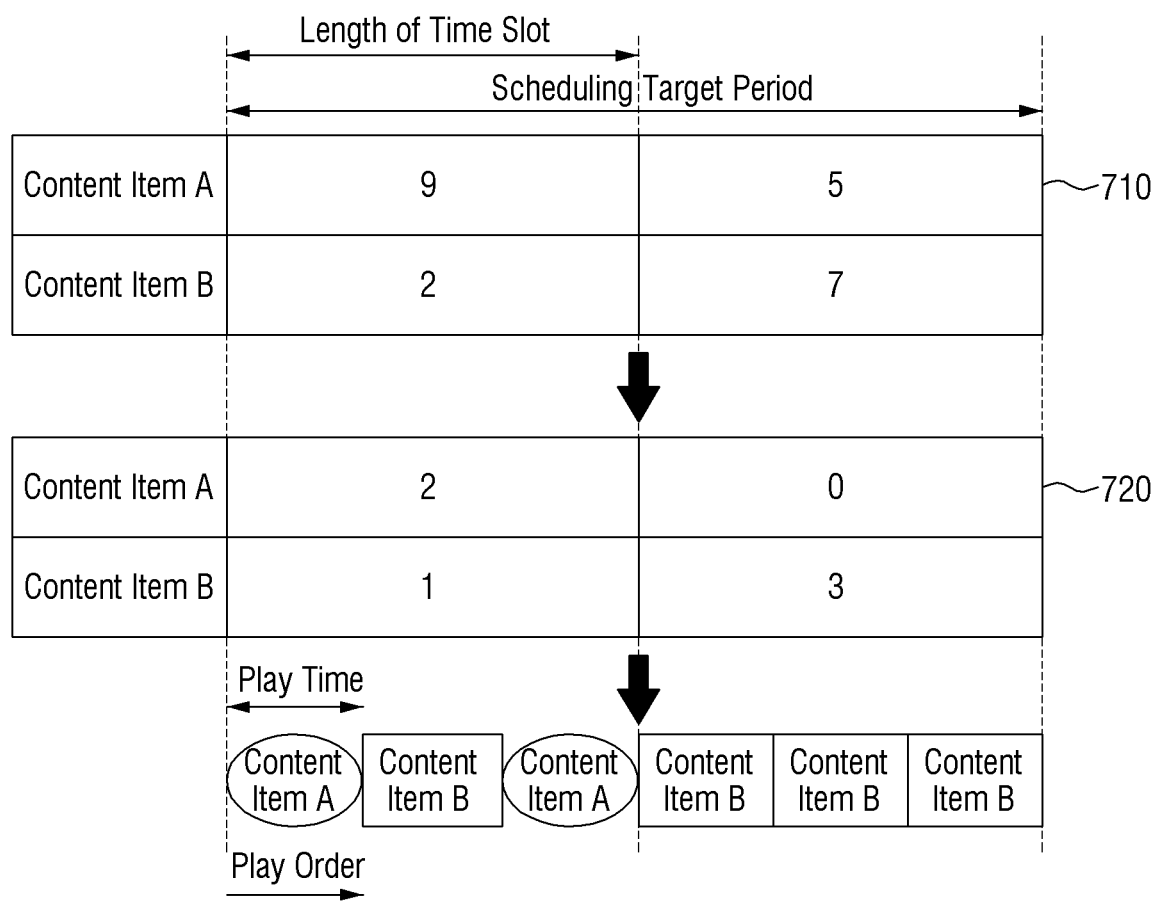
Figure 7C:
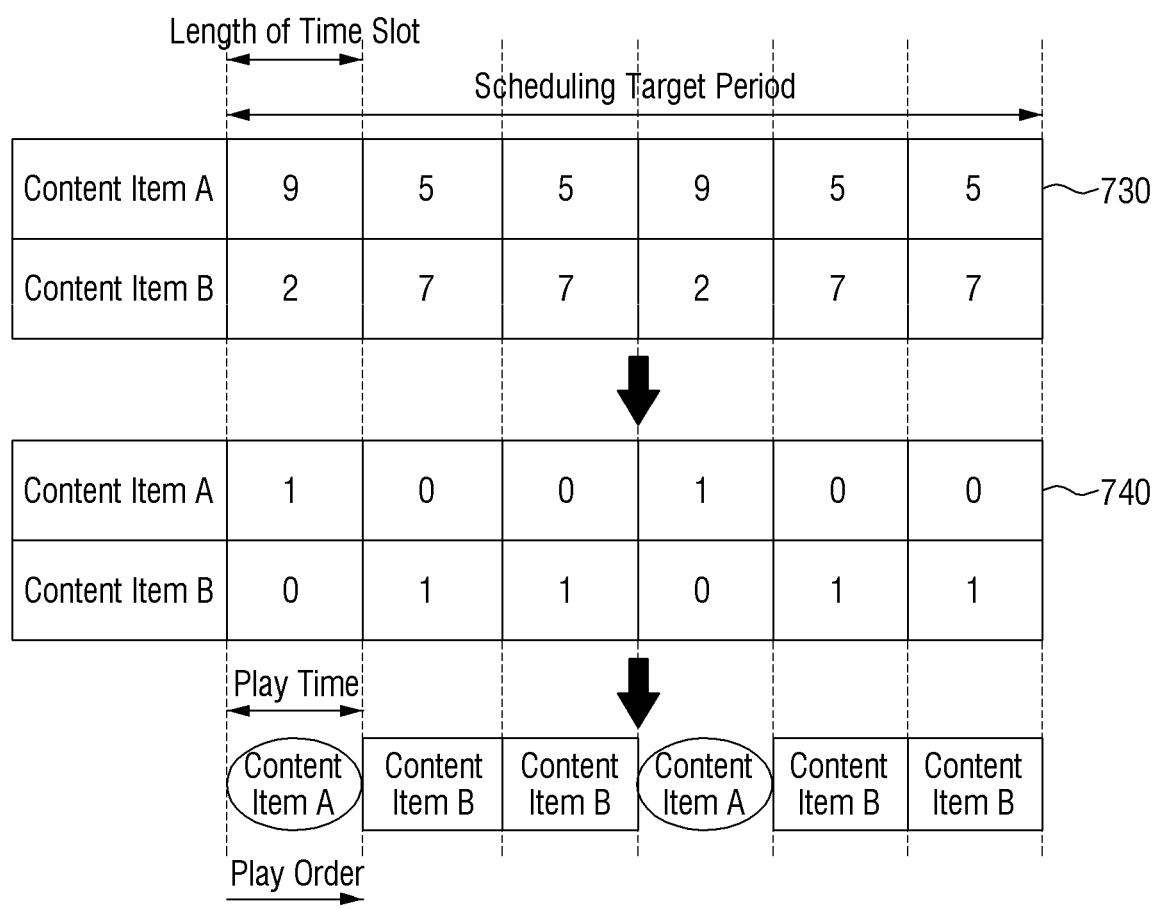

FIG. 7A shows the total play counts of content items A and B, FIG. 7B shows a case where each time slot is longer than the play times of the content items A and B, and FIG. 7B shows a case where the length of each time slot and the play times of the content items A and B are identical. Tables 710 and 730 of FIGS. 7B and 7C show the weight values of the content items A and B in each time slot, and tables 720 and 740 of FIGS. 7B and 7C show a scheduling result, i.e., the play counts of the content items A and B in each time slot. For convenience, it is assumed that the play times of the content items A and B are identical.

Referring to FIG. 7A, the total play count of the content item A is "2", and the total play count of the content item B is "4".

Referring to FIG. 7B, by performing scheduling in consideration of the weight values of the content items A and B in each time slot, the content scheduling apparatus 100 determines that the play counts of the content items A and B in a first time slot are "2" and "1", respectively. Since multiple content items each having a total play count of 1 or greater, i.e., the content items A and B, are allocated to the first time slot, an additional scheduling process may be needed to determine the play order of the content items A and B.

Specifically, the content scheduling apparatus 100 may perform an additional scheduling process to determine the play order of target content. For example, for a plurality of target content items allocated to a single time slot, the content scheduling apparatus 100 may perform an additional scheduling process to arrange the plurality of target content items either alternately or in a random order.

For content having a short play time, such as advertisement content, each time slot may preferably be set to be longer than the play time of the content, as shown in FIG. 7B, in order to reduce the cost of computing needed by scheduling.

Referring to FIG. 7C, the content scheduling apparatus 100 allocates the content item A, which has a large weight value in first and fourth time slots, to the first and fourth time slots. Specifically, the content scheduling apparatus 100 determines that the play counts of the content items A and B in each of the first and fourth time slots are "1" and "0", respectively.

That is, since only one target content having a total play count of 1 or less, i.e., the content item A or B, is allocated to each time slot, the result of performing scheduling on the content items A and B may be the same as the result of determining the order in which to play the content items A and B (i.e., A→B→B→A→B→B).

In short, in a case where the play time of target content and the length of each time slot are identical, the content scheduling apparatus 100 may determine the play order of the target content. In reality, the cost of computing may undesirably increase if each time slot is set to be short. Thus, it may be effective that the play order of target content is determined according to a predefined policy after determining the play count of target content in each time slot by setting each time slot to be sufficiently long.

A method in which the content scheduling apparatus 100 determines the weight value of the target content in each time slot based on the target content's preference for each target customer base and the floating population of each target customer base in each time slot will hereinafter be described with reference to FIGS. 8A through 8C.

In a case where the target customer base of target content consists only of a single age group such as 10s or 20s, the content scheduling apparatus 100 may determine the floating population of each target customer in each time slot as the weight value of the target customer in each time slot. However, in reality, the target customer base of the target content is highly likely to include more than one age group, in which case, the content scheduling apparatus 100 may determine the weight value of each time slot by calculating a weighted average using a weight value indicating the target content's preference for each age group. This will hereinafter be described in detail with reference to FIGS. 8A through 8C.

FIG. 8A shows weight values indicating target customer bases' preferences, FIG. 8B shows the floating populations of the target customer bases of FIG. 8A in each time slot, and FIG. 8C shows weight values calculated based on the information shown in FIG. 8A and the information shown in FIG. 8B. For convenience, it is assumed that there are three target customer bases, i.e., 10s, 20s, and 30s age groups, and three time slots, i.e., "9:00 a.m.", "3:00 p.m.", and "9:00 p.m." time slots, and that a total floating population is uniform in each of the three time slots.

Referring to FIG. 8A, weight values of 10, 50, and 40 are acquired by the content scheduling apparatus 100 and indicate the preferences of the 10s, 20s, and 30s age groups, respectively. The preferences of the 10s, 20s, and 30s age groups may be acquired from, for example, a content providing entity.

Referring to FIG. 8B, the floating populations of the 10s, 20s, and 30s age groups, which are acquired by the content scheduling apparatus 100, show that the 10s, 20s, and 30s age groups have a largest floating population in the "3:00 p.m.", "9:00 p.m.", and "9:00 a.m." time slots, respectively. As described above, the floating populations of the 10s, 20s, and 30s age groups may be acquired from, for example, an image analysis module.

Referring to FIG. 8C, the content scheduling apparatus 100 may determine the weight values of the "9:00 a.m.", "3:00 p.m.", and "9:00 p.m." time slots by calculating weighted average floating populations of the 10s, 20s, and 30s age groups using the weight values of the 10s, 20s, and 30s age groups.

Specifically, the weight value of the "9:00 a.m." time slot, i.e., 36, may be obtained by multiplying the floating populations of the 10s, 20s, and 30s age groups, i.e., 20, 20, and 60, by the weight values of the 10s, 20s, and 30s age groups, i.e., 10, 50, and 40, and adding up the results of the multiplication, i.e., 2 (=20*0.1), 10 (=20*0.5), and 24 (=60*0.4). In this manner, the weight values of the "3:00 p.m.", and "9:00 p.m." time slots may be calculated to be 24 and 40, respectively. The content scheduling apparatus 100 may readjust the weight values of the "9:00 a.m.", "3:00 p.m.", and "9:00 p.m." time slots, as necessary.

In the method described above with reference to FIGS. 8A through 8C, the content scheduling apparatus 100 determines the weight value of target content in each time slot based on the target content's preference for each target customer base and the floating population of each target customer base. Accordingly, the content scheduling apparatus 100 can relax any restriction on the type of input data needed for scheduling and can thus perform scheduling using various types of input data.

Various linear programming models that can be generated by the content scheduling apparatus 100 will hereinafter be described with reference to FIGS. 9A through 13.

First, basic linear programming models that can be generated in S500 of FIG. 6 will hereinafter be described with reference to FIGS. 9A and 9B. In the description that follows, it is assumed that there are n target content items, a scheduling target period is one day, and the length of each time slot is one hour. However, the number of target content items, the length of the scheduling target period, and the length of each time slot are not particularly limited, but may vary.

Referring to FIG. 9A, $X_{ij}$ denotes a decision variable indicating the play count of a j-th target content item, which is one of the n target content items, in an i-th time slot. For example, $X_{15}$ indicates the play count of a fifth target content item in a first time slot. Since there are a total of 24 time slots (=24 hr/1 hr), an index i may be an integer between 1 and 24, an index j may be an integer between 1 and n, and there may be a total of 24n decision variables ($X_{ij}$).

A function that can maximize the sum of the decision variable $X_{ij}$ multiplied by a weight value $W_{ij}$, which indicates the j-th target content item's preference for the i-th time slot, may be set as an objective function of a linear programming model because the value of the objective function becomes greater when target content is allocated to a time slot having a high preference level than when the target content is allocated to a time slot having a low preference level.

The weight value $W_{ij}$ is the weight value that the j-th target content item has in the i-th time slot. The more preferred the j-th target content item is, the greater the weight value $W_{ij}$ becomes.

Alternatively, a function that can minimize the sum of the decision variable $X_{ij}$ multiplied by the weight value $W_{ij}$ may be set as an objective function of a linear programming model according to the duality of linear programming. It is noted that a linear programming model having the function that can minimize the sum of the decision variable $X_{ij}$ multiplied by the weight value $W_{ij}$ as its objective function is merely a variation of the linear programming model of FIG. 9A according to the duality of linear programming and is thus substantially the same as the linear programming model of FIG. 9A. The duality of linear programming is already well known in the art to which the present disclosure pertains, and thus, a detailed description thereof will be omitted in order not to obscure the gist of the present disclosure. The objective functions and constraints of other linear programming models that will be described later may also be varied according to the duality of linear programming, but such variations also fall with the scope of the present disclosure.

The content scheduling apparatus 100 may set one of a first constraint that the sum of the decision variable $X_{ij}$ is greater than or equal to a total play count $N_j$ of the j-th target content item, i.e., i.e., $\Sigma X_{ij} \geq N_j$, and a second constraint that the sum of the decision variable $X_{ij}$ is smaller than or equal to the total play count $N_j$ of the j-th target content item, i.e., $\Sigma X_{ij} \leq N_j$, as a constraint of a linear programming model.

Specifically, in a case where the total play count of each of the n target content items refers to a minimum number of times each of the n target content items should be played over a scheduling target period, the content scheduling apparatus 100 may set the first constraint as a constraint of a linear programming model. On the other hand, in a case where the total play count of each of the n target content items refers to a maximum number of times each of the n target content items can be played over the scheduling target period, the content scheduling apparatus 100 may set the second constraint as a constraint of a linear programming model. For example, if the total play count of each of the n target content items is given by a content contract, the content scheduling apparatus 100 may set the first constraint as a constraint of a linear programming model because the number of plays of each of the n target content items, specified in the content contract, generally refers to the minimum number of times each of the n target content items should be played over the scheduling target period. FIG. 9A shows an example in which the total play count of each of the n target content items refers to the minimum number of times each of the n target content items should be played over the scheduling target period.

Since the above-mentioned total play count-related constraint such as the first or second constraint can be set for each of the n target content items, a total of n total play count-related constraints ($\Sigma X_{ij} \leq N_j$ where j=1, 2, ..., n) can be set in a linear programming model.

The content scheduling apparatus 100 may set a constraint that the sum of the decision variable $X_{ij}$ multiplied by a play time $H_j$ of the j-th target content item is smaller than or equal to 3600 seconds, which is the length of each time slot, i.e., $\Sigma X_{ij} * H_j \leq 3600$, as an additional constraint of a linear programming model in order for the play count of each of the n target content items in each time slot, i.e., the decision variable $X_{ij}$, to be within a predetermined range corresponding to the length of each time slot. Since the additional constraint can be set for each time slot, a total of 24 additional constraints (i.e., $\Sigma X_{ij} * H_j 3 \leq 3600$ where i=1, 2, ..., 24) can be set in a linear programming model.

In the linear programming model, the length of each time slot is set to 3600 seconds, which is equal to one hour, in consideration that the play time $H_j$ is measured in seconds.

A non-negative constraint, i.e., $X_{ij} \geq 0$, may be set as a final constraint of a linear programming model in consideration that the decision variable $X_{ij}$, which indicates the play count of the j-th target content item in the i-th time slot, is always greater than or equal to zero. Since the non-negative constraint is set for each of the 24n decision variables, a total of 24n final constraints can be set in a linear programming model.

Once a linear programming model is generated, the content scheduling apparatus 100 may determine the play count of each of the n target content items in each time slot by finding the optimal solution or approximate optimal solution of the linear programming model, i.e., the value of the decision variable $X_{ij}$ that maximizes the objective function of FIG. 9A, from among feasible solutions that satisfy the constraints shown in FIG. 9A.

In a case where the content scheduling method 100 uses the simplex method, the linear programming model of FIG. 9A may be converted into standard form, i.e., a linear programming model shown in FIG. 9B. The linear programming model of FIG. 9B is almost the same as the linear programming model of FIG. 9A except that its constraints are represented as equations, rather than as inequalities, by using a slack variable (or surplus variable) $S_{ij}$. That is, the linear programming models of FIGS. 9A and 9B are substantially identical, even through there are differences therebetween. The slack variable (or surplus variable) $S_{ij}$ is already well known in the art to which the present disclosure pertains, and thus, a detailed description thereof will be omitted.

The basic linear programming model that can be generated by the content scheduling apparatus 100 have been described above with reference to FIGS. 9A and 9B. Linear programming models that can be generated by the content scheduling apparatus 100 when a variety of constraints are added will hereinafter be described.

First, a linear programming model that can be generated by the content scheduling apparatus 100 when a constraint regarding the operation time of the content playing apparatus 300 is added will hereinafter be described with reference to FIG. 10.

The linear programming model of FIG. 9A is a linear programming model established on the assumption that the content playing apparatus 300 continues to operate during an entire scheduling target period. However, in reality, the content playing apparatus 300 may not necessarily be driven throughout the entire scheduling target period. For example, the time for which the place where the content playing apparatus 300 is installed can be accessed may be fixed, or the operation time of the content playing apparatus 300 may be restricted according to the operation policy of the content playing apparatus 300. In this example, the content scheduling apparatus 100 changes the scheduling target period to coincide with the operation time of the content playing apparatus 300, thereby generating a linear programming model similar to that shown in FIG. 10.

For example, in response to information indicating that the operation time of the content playing apparatus 300 is 18 hours (from 6:00 to 23:00) being acquired, the content scheduling apparatus 100 may change the length of the scheduling target period to 18 hours, thereby obtaining the linear programming model of FIG. 10.

The linear programming model of FIG. 10 differs from the linear programming model of FIG. 9A in the total number of decision variables ($X_{ij}$), and this is because as the scheduling target period is shortened according to the operation time of the content playing apparatus 300, the number of time slots to be determined by the content scheduling apparatus 100 is reduced. That is, if the scheduling target period is shortened to 18 hours (from 6:00 to 23:00), a total of 18 time slots may be generated, and the content scheduling apparatus 100 may reduce the number of decision variables ($X_{ij}$) accordingly by controlling the range of values of an index i.

A linear programming model that can be generated by the content scheduling apparatus 100 when a constraint regarding the priority value of target content is further added will hereinafter be described with reference to FIG. 11.

The linear programming model of FIG. 10 is generated only using the weight value of each target content item in each time slot. The content scheduling apparatus 100 may additionally use the priority value of each target content item to generate a linear programming model.

The priority value of target content is a value determined based on additional information not reflected in the weight value of the target content in each time slot. For example, the priority value of target content may be a value determined by the content scheduling apparatus 100 based on the contract cost of the target content, determined by a content providing entity and a content playing entity. If the priority value of target content means a priority value determined according to the contract cost of the target content, a target content item having a high contract cost may have a high priority value.

The priority value of target content may be used to determine priorities among a plurality of target content items having the same weight value in each time slot or to allocate target content items having a low weight value in each time slot, but having a high priority value, ahead of other target content items. Accordingly, the priority value of target content may be additionally reflected in the objective function of a linear programming model as a coefficient, as shown in FIG. 11.

Referring to the objective function of the linear programming model of FIG. 11, symbol $\otimes$ denotes an arbitrary operator. The content scheduling apparatus 100 may determine the type of the operator $\otimes$ in consideration of the relationship between the weight value ($W_{ij}$) of target content in each time slot and the priority value ($R_j$) of the target content. Alternatively, the type of the operator $\otimes$ may be set in advance based on experimental results obtained using various operators.

For example, the operator $\otimes$ may be set as a product operator. That is, the content scheduling apparatus 100 may set a function that maximizes the sum of the weight value ($W_{ij}$) of target content in each time slot, multiplied by the priority value ($R_j$) of the target content and a decision variable ($X_{ij}$) corresponding to the target content as the objective function of a linear programming model. In this example, target content can be placed in each time slot if it either has a large weight value ($W_{ij}$) in each time slot or has a high priority value ($R_j$).

In the linear programming model of FIG. 11, it is assumed that the priority value of target content varies depending on the type of the target content, but is uniform in each time slot. Thus, the priority value of target content is represented as $R_j$. However, in a case where the priority value of target content differs from one time slot to another time slot, the priority value of the target content may be represented as $R_{ij}$.

The benefits of reflecting not only the weight value of target content in each time slot, but also the priority value of the target content, in the objective function of a linear programming model are as follows. First, if the priority value of the target content is determined by the contract cost of the target content, the profit of a content playing entity can be further improved because scheduling can be performed in further consideration of the contract cost of the target content as well as the weight value of the target content in each time slot. That is, among multiple target content items having similar weight values in each time slot, target content items that are paid more are placed ahead of other content items, and thus, the effect of raising the contract cost of target content can be achieved.

A linear programming model that can be generated by the content scheduling apparatus 100 when a constraint regarding the minimum play count and/or the maximum play count of target content in each time slot is further added will hereinafter be described with reference to FIG. 12.

Referring to FIG. 12, in response to information regarding the minimum play count and/or the maximum play count of target content in each time slot being acquired, the content scheduling apparatus 100 may generate a new linear programming model by adding the minimum play count and/or the maximum play count of the target content in each time slot to an existing linear programming model as a new constraint. For example, in a case where the minimum play count and the maximum play count of the target content are 8 and 32, respectively, the content scheduling apparatus 100 may generate a linear programming model shown in FIG. 12.

The linear programming model of FIG. 12 differs from the linear programming model of FIG. 11 in that it further has an additional constraint regarding the play count ($X_{ij}$) of target content in each time slot, i.e., $8 \leq X_{ij} \leq 32$. The content scheduling apparatus 100 may calculate and produce a scheduling result by finding an optimal solution or approximate optimal solution that can further satisfy the additional constraint.

A linear programming model that can be generated by the content scheduling apparatus 100 when a constraint regarding the play ratio of a certain type of content is further added will hereinafter be described with reference to FIG. 13.

In actual use of, for example, an outdoor advertising system, there may be a constraint, either mandated by a regulation or added according to the operation policy of the outdoor advertising system, that a certain type of content such as public-purpose content or advertisement content for a particular shopping mall should be played at a certain ratio. For example, there is a regulation in the "Enforcement Decree of the Act on the Management of Outdoor Advertising and the Promotion of the Outdoor Advertising Industry" that advertisement content for public purposes should be played within the range of 20/100 per hour.

In response to information regarding the play ratio of a certain type of content being acquired, the content scheduling apparatus 100 may generate a new linear programming model by adding the play ratio of the certain type of content to an existing linear programming model as a new constraint, and this is because if a constraint regarding the play ratio of the certain type of content is in place, a total scheduling time available for target content is shortened. For example, if public-purpose content is added at a ratio of 20/100 per hour, other types of target content can only be scheduled to be played within the range of 48 minutes per hour (=60 min*80/100), and thus, the play ratio of the public-purpose content may be set as a constraint. The content scheduling apparatus 100 may generate a new linear programming model by adding a constraint that the total play time of each content type is less than or equal to a value obtained by multiplying the play ratio of each type of target content by the length of an entire scheduling target period. As described above, when a constraint regarding the operation time of the content reproduction apparatus 300 is added, the operation time of the content reproduction apparatus 300 becomes the scheduling target period.

The linear programming model of FIG. 13 is a linear programming model generated when the operation time of the content reproduction apparatus 300 is 18 hours and the play ratios of public advertisement content, shopping mall advertisement content, and external advertisement content are 20%, 40%, and 40%, respectively. Referring to FIG. 13, a variable t denotes the type of content, wherein the variable t indicates public advertisement content when having a value of 1, shopping mall-related content when having a value of 2, and external advertisement content when having a value of 3. $\Sigma\Sigma X_{ij}^3 * H_j$ indicates the total play time of each type of target content, and a variable $R^1$ indicates the play ratio of each type of target content.

Referring to FIG. 13, a play ratio $R^1$ of public advertisement content is 0.2, a play ratio $R^2$ of shopping mall advertisement content is 0.4, a play ratio $R^3$ of external advertisement content is 0.4, and the scheduling target period is 18 hours, which is 3600*18 seconds.

In a case where target content is external advertisement content (i.e., t=3), the content scheduling apparatus 100 calculates and produces a scheduling result by finding the optimal solution or approximate optimal solution of a linear programming model having added thereto a constraint regarding the play ratio $R^3$, i.e., $\Sigma\Sigma X_{ij}^3 * H_j \leq 3600*18*R^3$. Also, in a case where the target content is public advertisement content (i.e., t=1), the content scheduling apparatus 100 calculates and produces a scheduling result by finding the optimal solution or approximate optimal solution of a linear programming model having added thereto a constraint regarding the play ratio $R^1$, i.e., $\Sigma\Sigma X_{ij}^1 * H_j \leq 3600*18*R^1$.

Various linear programming models that can be generated by the content scheduling apparatus 100 when a variety of constraints are given have been described above with reference to FIGS. 9A through 13. As described above, even if a variety of constraints are given, the content scheduling apparatus 100 can perform scheduling in such a manner that the given constraints can be satisfied and the objective function of a linear programming model can be optimized. Also, the content scheduling apparatus 100 can provide a flexible, "fine-grained" scheduling method based on various linear programming models.

The inventive concept of the present disclosure, described above with reference with reference to FIGS. 6 through 13, can be implemented as code on a computer-readable recording medium. The computer-readable recording medium may be, for example, a removable recording medium, such as a CD, a DVD, a Blu-ray disc, a USB storage device, or a removable hard disk, or a fixed recording medium, such as a ROM, a RAM, or a hard disk embedded in a computer. A computer program recorded on the computer-readable recording medium may be transmitted from one computing device to another computing device via a network such as the Internet to be installed and used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims.

The exemplary embodiments should be considered in a descriptive sense only and not for purposes of limitation.

What is claimed is:

1. A content scheduling method, which is performed by a content providing system comprising a content scheduling apparatus and a content playing apparatus, the content playing apparatus comprising an image capturing apparatus, the content scheduling method comprising:

capturing, by the image capturing apparatus included in the content playing apparatus, images around a designated geographical area in which the content playing apparatus is positioned;

acquiring, by at least one processor of the content scheduling apparatus, demographic data and a total floating population by performing image analysis on the images captured by the image capturing apparatus, the total floating population representing a number of people, who visited or pass by the designated geographical area;

acquiring, by the at least one processor of the content scheduling apparatus, a total play count of target content;

determining, by the at least one processor of the content scheduling apparatus, a plurality of weight values of the target content with respect to a plurality of time slots, each weight value of the plurality of weight values indicating a first preference for the target content with respect to each time slot of the plurality of time slots, wherein the each weight value of the target content in the each time slot is determined based on the total floating population in the each time slot;

generating, by the at least one processor of the content scheduling apparatus, a linear programming model using the acquired total play count and the plurality of weight values;

determining, by the at least one processor of the content scheduling apparatus, a play count of the target content in the each time slot of the plurality of time slots based on the linear programming model, and playing, by the content playing apparatus, the target content according to the determined play count, wherein the generating the linear programming model comprises:

setting the play count of the target content in the each time slot as a decision variable of the linear programming model;

setting an objective function of the linear programming model using the each weight value of the target content in the each time slot and the decision variable; and setting a constraint of the linear programming model using the total play count of the target content and the decision variable, and wherein the determining the play count of the target content in each time slot comprises determining a value of the decision variable that maximizes a sum of values obtained by multiplying the plurality of weight values of the target content in the plurality of time slots by the decision variable, from among feasible solutions of the linear programming model that satisfy the constraint.

2. The content scheduling method of claim 1, wherein the each weight value of the target content in the each time slot is determined based on (i) a second preference for the target content with respect to each target customer base of a plurality of target customer bases, and (ii) a first floating population of the each target customer base in the each time slot, wherein the first floating population represents a number of people, of the each target customer base in the each time slot, who visited or pass by the designated geographical area.

3. The content scheduling method of claim 2, wherein the determining the each weight value of the target content comprises:

calculating a weighted average of the first floating population of the each target customer base in the each time slot using the second preference for the target content with respect to the each target customer base; and determining the each weight value of the target content in the each time slot based on the calculated weighted average.

4. The content scheduling method of claim 2, wherein the first floating population of the each target customer base in the each time slot is determined based on the total floating population in the each time slot and the demographic data.

5. The content scheduling method of claim 1, wherein the constraint of the linear programming model requires that a sum of the decision variable for the each time slot be greater than or equal to the total play count of the target content.

6. The content scheduling method of claim 1, wherein the setting the constraint of the linear programming model comprises:

acquiring a play time of the target content; and setting the constraint such that a sum of values obtained by multiplying the play time of the target content by the decision variable for the each time slot is less than or equal to a length of the each time slot.

7. The content scheduling method of claim 1, further comprising:

determining a priority value of the target content, wherein the generating the linear programming model further comprises:

setting the objective function of the linear programming model using the plurality of determined weight values and the determined priority value.

8. The content scheduling method of claim 7, wherein the setting the objective function of the linear programming model comprises setting a function that maximizes a sum of values obtained by multiplying the plurality of weight values of the target content in the plurality of time slots by the priority value of the target content and the decision variable for the each time slot.

9. The content scheduling method of claim 1, further comprising:

acquiring a minimum play count and a maximum play count of the target content in the each time slot, wherein the generating the linear programming model further comprises:

setting the constraint of the linear programming model using the acquired minimum play count and the acquired maximum play account.

10. The content scheduling method of claim 9, wherein the constraint requires that the decision variable be greater than or equal to the acquired minimum play count and is less than or equal to the acquired maximum play count.

11. The content scheduling method of claim 1, further comprising:

acquiring a play ratio for each type of the target content, wherein the generating the linear programming model further comprises:

setting the constraint of the linear programming model using the acquired play ratio.

12. The content scheduling method of claim 11, wherein, according to the constraint of the linear programming model:

when the target content is of a first type, a first total play time of first-type target content is less than or equal to a scheduling target period multiplied by a first play ratio of the first-type target content; and when the target content is of a second type, a second total play time of second-type target content is less than or equal to the scheduling target period multiplied by a second play ratio of the second-type target content.

13. A content providing system comprising:

a content playing apparatus comprising an image capturing apparatus, the image capturing apparatus configured to capture images around a designated geographical area in which the content playing apparatus is positioned; and a content scheduling apparatus comprising:
  at least one processor;
  a memory configured to store a computer program which, when executed by the at least one processor, causes the at least one processor to perform operations comprising:
    acquiring demographic data and a total floating population by performing image analysis on the images captured by the image capturing apparatus, the total floating population representing a number of people, who visited or pass by the designated geographical area;
    acquiring a total play count of target content;
    determining a plurality of weight values of the target content with respect to a plurality of time slots, each weight value of the plurality of weight values indicating a preference for the target content with respect to each time slot of the plurality of time slots, wherein the each weight value of the target content in the each time slot is determined based on the total floating population in the each time slot;
    generating a linear programming model using the acquired total play count and the plurality of weight values; and
    determining a play count of the target content in the each time slot of the plurality of time slots based on the linear programming model, wherein the content playing apparatus is configured to play the target content according to the determined play count, wherein the generating the linear programming model comprises:
  setting the play count of the target content in the each time slot as a decision variable of the linear programming model;
  setting an objective function of the linear programming model using the each weight value of the target content in the each time slot and the decision variable; and
  setting a constraint of the linear programming model using the total play count of the target content and the decision variable, and wherein the determining the play count of the target content in each time slot comprises determining a value of the decision variable that maximizes a sum of values obtained by multiplying the plurality of weight values of the target content in the plurality of time slots by the decision variable, from among feasible solutions of the linear programming model that satisfy the constraint.

14. A non-transitory computer-readable storage medium storing instructions which, when executed by at least one processor of a content providing system comprising a content playing apparatus, cause the at least one processor to perform operations comprising:

controlling an image capturing apparatus included in the content playing apparatus to capture images around a designated geographical area;

acquiring demographic data and a total floating population by performing image analysis on the images captured by the image capturing apparatus, the total floating population representing a number of people, who visited or pass by the designated geographical area;

acquiring a total play count of target content;

determining a plurality of weight values of the target content in with respect to a plurality of time slots, each weight value of the plurality of weight values indicating a preference for the target content with respect to each time slot of the plurality of time slots, wherein the each weight value of the target content in the each time slot is determined based on the total floating population in the each time slot;

generating a linear programming model using the acquired total play count and the plurality of weight values; and determining a play count of the target content in the each time slot of the plurality of time slots based on the linear programming model; and controlling the content playing apparatus to play the target content according to the determined play count, wherein the generating the linear programming model comprises:
  setting the play count of the target content in the each time slot as a decision variable of the linear programming model;
  setting an objective function of the linear programming model using the each weight value of the target content in the each time slot and the decision variable; and
  setting a constraint of the linear programming model using the total play count of the target content and the decision variable, and wherein the determining the play count of the target content in each time slot comprises determining a value of the decision variable that maximizes a sum of values obtained by multiplying the plurality of weight values of the target content in the plurality of time slots by the decision variable, from among feasible solutions of the linear programming model that satisfy the constraint.

* * * * *